United States Patent [19]

Kupczyk

[11] Patent Number: 4,548,135
[45] Date of Patent: Oct. 22, 1985

[54] FLOOR CONVEYOR SYSTEM

[75] Inventor: Werner Kupczyk, Frankfurt, Fed. Rep. of Germany

[73] Assignee: Fredenhagen KG, Offenbach am Main, Fed. Rep. of Germany

[21] Appl. No.: 659,860

[22] Filed: Oct. 11, 1984

Related U.S. Application Data

[63] Continuation of Ser. No. 383,834, Jun. 1, 1982, abandoned.

[30] Foreign Application Priority Data

Jun. 15, 1981 [DE] Fed. Rep. of Germany ....... 3123638
Jun. 15, 1981 [DE] Fed. Rep. of Germany ....... 3123706

[51] Int. Cl.⁴ .................... B65G 37/00; B61B 13/00; B61J 1/10
[52] U.S. Cl. ..................................... 104/135; 104/48; 104/170; 104/172 BT; 198/465.1
[58] Field of Search ................. 104/48, 134, 135, 165, 104/168, 170, 172 BT, 172 R; 198/472, 473

[56] References Cited

U.S. PATENT DOCUMENTS 3,918,367 11/1975 Alimanestianu et al. ... 104/172 R X
3,929,079 12/1975 Eliassen .......................... 104/165 X
3,991,685 11/1976 Toby ..................................... 104/165
4,048,923 9/1977 Giraud ............................. 104/165 X
4,078,499 3/1978 Giraud ................................. 104/165
4,144,961 3/1979 Kasahara et al. ................... 198/472
4,206,708 6/1980 Behle .............................. 104/165 X
4,274,532 6/1981 Johnson .......................... 198/472 X

FOREIGN PATENT DOCUMENTS 1756205 3/1970 Fed. Rep. of Germany .
2924361 12/1980 Fed. Rep. of Germany .
640557 7/1928 France .

OTHER PUBLICATIONS

Patent Abstracts of Japan, Unexamined Applications, M. Bield, vol. 4, No. 92, Jul. 3, 1980.

Primary Examiner—Robert B. Reeves
Assistant Examiner—David F. Hubbuch
Attorney, Agent, or Firm—Cushman, Darby & Cushman

[57] ABSTRACT

A floor conveyance system for transporting goods along a preselected conveyance path includes a drag chain conveyor defining a first surface and a skid conveyor having one end adjacent to the drag chain conveyor and defining a second surface disposed at a higher level than the first surface of the drag chain conveyor. A conveying frame is operatively engageable with the drag chain and skid conveyors for supporting goods thereon and includes front and rear pairs of wheels to permit for rolling movement of the conveying frame across the first surface and a pair of elongated parallel skid members mounted interiorly with respect to the front and rear pairs of wheels and each having a longitudinal length less than the separation dimension between the front and rear pairs of wheels. The parallel skid members establish sliding contact with the second surface when the conveying frame is conveyed along the skid conveyor. Thus, the front and rear pairs of wheels contact the first surface when the frame is conveyed by the drag conveyor while the pair of skid members are inoperative, and the front and rear pairs of wheels are disengaged from the first surface when the pair of skid members come into engagement with the second surface of the skid conveyor.

3 Claims, 2 Drawing Figures

FLOOR CONVEYOR SYSTEM

This is a continuation of application Ser. No. 383,834, filed June 1, 1982, abandoned.

BACKGROUND AND SUMMARY OF THE PRESENT INVENTION

The present invention relates to a floor conveyor system for transporting goods which are preferably arranged on carrying frames.

Floor conveyor systems typically comprise, among other structures, drag chain conveyors and carrying conveyors, which themselves can be sledge or skid conveyors and carrying chain conveyors. With drag chain conveyors, the material to be transported is conveyed exclusively by dragging or pushing. The conveying means functions so as to pull the goods only and thus does not exercise any load-carrying function. Furthermore, the conveying means is usually arranged within or underneath the conveying plane, sometimes even immediately above the conveying plane. By means of wheels mounted on the floorside of the lodging attachments for the goods to be transported, the transport will then take place on a track. While drag chain conveyors require little maintenance to some extent they show considerable disadvantages regarding speed adjusment, accumulation and direction changing capabilities in narrow confines.

With a sledge or skid conveyor, the conveying means not only handles the transport of the goods but also simultaneously exercises load-carrying functions. Thus, the conveyance can be effected via chains or pulleys. Over skids or slide shoes, respectively, the goods to be transported are sitting on the pulleys or chains and are carried along by frictional contact. Sledge or skid conveyors have the advantage that the transporting speed can be quickly adapted to local factors. For example, when operating in assembling shops of the motor car industry, the transport speed can be adapted to accommodate the periodic times required the different processing stations. A drag chain conveyor that can be defined as a continuous conveyor for piece goods, does not offer such a possibility. However, a disadvantage of sledge or skid conveyors is that they typically require rather intensive maintenance caused especially by the plurality of driving means, and that they are prone to being disabled due to the more complicated control mechanism.

It is the object of the present invention therefore to provide a floor conveying system for transporting goods which are preferably arranged on carrying frames, which system brings about a variable transport speed of the goods to be transported, an accumulation of the goods on the most narrow space and which permits quick and reliable change of direction, while at the same time ensuring little and easy maintenance.

According to the present invention, this object is achieved in that the floor conveying system is a combination of a drag chain conveyor and sledge or skid conveyor. A conveying system constructed in such a manner includes all of the advantages that the drag chain conveyor and the sledge or skid conveyor without their respective disadvantages. If, for example, the floor conveyor system according to the present invention is used in assembling shops of the motor car industry, then the drag chain conveyor of favorable maintenance can be put into operation in those areas where there is a very dirty atmosphere as in the paint shop, or where transport takes place over long distances of a substantially straight direction. However, if a change of direction of the goods to be transported is desired to be made on a narrow space or it is desired to distribute the goods into different conveying lines, then the sledge or skid conveyor will be preferred.

Thus, by the teaching according to the present invention, for the first time a conveying system has been provided where that conveyor (e.g. drag chain conveyor or sledge/skid conveyor) can be put into operation which promotes the best solution possible to transport problems. Thus, automobile bodies can be transported through a paint shop, for example, by means of a drag chain conveyor in order to deliver them at the exit thereof to a sledge conveyor which then distributes them to available drying ovens in which the transport is again made by means of drag chain conveyors. The reader should appreciate therefore that in this manner there will be a tremendous saving of space in areas between the paint shop and the drying ovens. In the same manner, a sledge or skid conveyor facilitates the sorting of the delivered material, which first could have been transported by a drag chain conveyor. Thus, the transfer from one conveyor to the other is done by means of conventional transferring equipment.

Changes of direction, e.g. longitudinal transportation in different directions or a cross transportation with the sledge or skid conveyor, are achieved in an embodiment of the present invention in that the goods to be transported, before changing the direction, are taken up by a lifting table along which the cross transportation takes place, at least to some extent.

Consequently, the lifting table represents a section of the sledge or skid conveyor which executes a lifting motion, this section being long enough to accomodate at least one receiving attachment for the goods to be transported. Due to the lifting movement of the lifting table it is guaranteed that the wheels of the receiving attachment for the goods to be transported, at the change of the transport direction, will not engage the conveying attachments, whether they are pulleys or chains, of the adjacent sections of the sledge conveyor.

According to a further embodiment of the invention, the goods being transported in the floor conveyor system can be accumulated.

An arrangement preferably comprising a carrying frame to receive the goods to be transported, with which independent of the available floor conveyor system, transport can be effected without any reloading of the goods to be transported, is provided with wheels as well as skids that are arranged on the floorside of the carrying frame. The floorside contact surfaces of the wheels are on a level different from that of the skids. Consequently, if the carrying frame accomodating the goods to be transported is dragged along on the floor by means of the drag chain conveyor, the skids will not come into contact with the floor and thus there will be no disturbance of the normal flow of the drag chain conveyance. If thereafter the carrying frame is picked up by the skid conveyor, the skids will then come into mutual reaction with the skid conveyor only since the transport level of the skid conveyor is higher than that of the drag chain conveyor in order to obtain a clearance between the wheels of the carrying frame and the floor.

In the preferred embodiment of the present invention there are provided two skids which are arranged in parallel and are separated by a distance relative to each other. Furthermore, the skids extend parallel to the main transport direction. Moreover the wheels are preferably arranged outside the skids, the length of which can be whatever is desired e.g. smaller than the axle distance of the outermost wheels.

It must further be pointed out that the arrangement should include a carrying frame, on which the goods to be transported can be put and which at its floor-side includes the wheels and skids.

By this accomodation arrangement according to the present invention, for the first time it has now become possible to transport the goods not only on a drag chain conveyor but also on a skid or sledge conveyor with only one carrying frame for the goods to be transported.

BRIEF DESCRIPTION OF THE ACCOMPANYING DRAWINGS

Further details, advantages and features of the invention will result from preferred examples of embodiment as shown in the accompanying drawings, in which:

FIG. 1 is a schematic plan view of a floor conveyor system according to the present invention, and FIG. 2 is a sectional view of a carrying frame for the goods to be transported by the floor conveyor system of FIG. 1.

DETAILED DESCRIPTION OF THE PREFERRED EXEMPLARY EMBODIMENT

Figure 1:
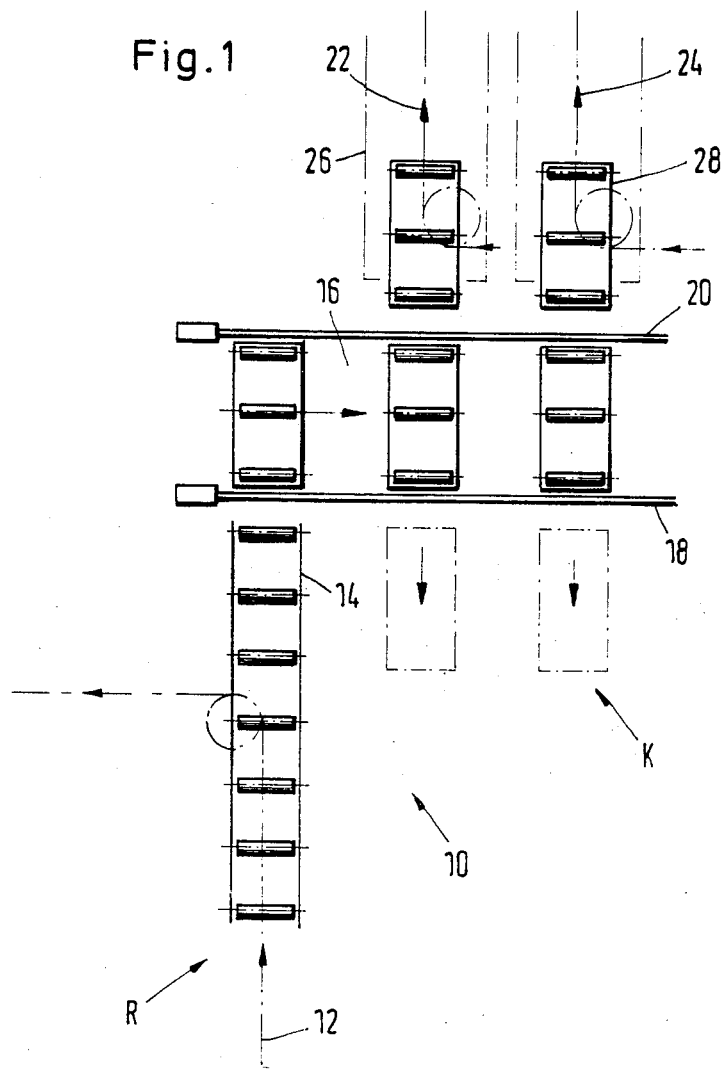

In FIG. 1, the preferred exemplary embodiment of a floor conveyor system 10 according to the present invention is shown wherein transfer is made from a drag chain conveyor R to a skid conveyor K and vice versa. Goods to be transported (not shown) are transported from a section 12 of the drag chain conveyor R to, e.g., a point A. Thereafter, the goods are disengaged from the drag chain conveyor R which is then routed away from the system. By means of a transfer attachment (not shown in detail) the goods to be transported come into engagement with the section 14 of the skid conveyor K, so as to be placed on a lifting table 16 via rollers 17. Transfer between section 12 of the drag chain conveyor R to the adjacent section 14 of the skid conveyor K to the lifting table 16 can be effected by providing a slope or ramp at point A. Due to lifting table 16, it is ensured that the wheels 32, 34 of the accommodating member 30 (see FIG. 2) for the goods will not engage the skid conveyor K when there is a change of the transport direction either from a longitudinal conveyance into a cross conveyance or vice versa. The conveying elements required for cross conveyance such as chains or rollers designated by reference numerals 18 and 20 are arranged at the side of and parallel to the lifting table 16. Thus, at the time that accommodating member 30 is transferred between section 14 of skid conveyor K and lifting table 16, lifting section 16c of the lifting table 16 is brought into a lifted condition. Subsequently, the lifting table 16 is lowered so that the lifting section 16c of carrying frame can be cross-conveyed through frictional contact of skids 38 along the conveying chains 18 and 20. Starting from the lifting table 16, it is then practical to make another longitudinal conveyance, e.g., in different directions. However, before transporting the goods in different longitudinal direction, the respective desired lifting section 16a or 16b of the lifting table 16 must be upwardly moved so that the wheels 32, 34 will not contact the conveying chains 18 and 20 which are required for the cross-conveyance. Starting from the lifting table 16, after a short-distance of longitudinal conveyance, delivery to drag chain conveyors 22 and 24 can then be effected, which conveyors can drag the goods, e.g., through dirty atmosphere processing zones 26 and 28.

The above embodiment ensures that by the combination of drag chain/sledge or skid conveyor according to the present invention, the goods to be transported can undergo a change of direction in a narrow space and within the desired distribution pattern.

Figure 2:
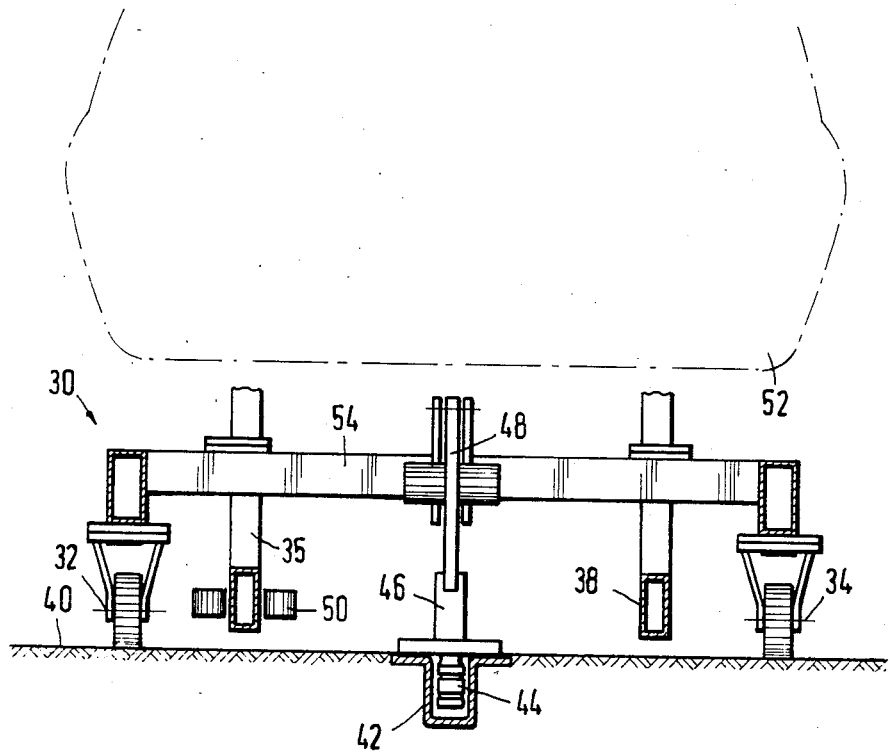

FIG. 2 shows an accomodation member 30 for goods to be transported by the floor conveyor system according to FIG. 1 and includes a carrying frame 54. Thus, the accommodation member 30 accommodates both a drag chain conveyor R or a sledge/skid conveyor K so as to be conveyed thereby. For this purpose, the carrying frame 54 is provided with wheels 32, 34 and skids 36, 38, which regarding their floorside contact surface are positioned on different levels, that is, the contact surfaces of the wheels 32 and 34 are lower than those of the skids 36 and 38.

If it is assumed that the transport of the carrying frame 54 on which goods, such as a motor car body 52 can be fastened, is effected by means of the drag chain conveyor R, the carrying frame 54 will then move along the floor 40 via the wheels 32 and 34 and is thereby pulled by a conveyance system being composed of a chain guide 42 and a chain 44. In this embodiment, the chain 44 has a pusherdog 46 engaging in a conventional manner a driving hitch 48 that is arranged on the carrying frame 54. Of course, the pusherdog 46 can also be rigidly mounted on the carrying frame 54 whereas the driving hitch 48 is connected with the chain 44. In the embodiment of FIG. 2 moreover, the conveyance system has been designed as an underfloor type, however, it is to be understood that the drag chain conveyor R can also be an above floor conveyor.

If the carrying frame 54 is moved by means of the carrying or sledge/skid conveyor K, the skids 36 and 38 come into engagement with rollers (not shown in FIG. 2) that can also be replaced by a chain, in order to be driven by frictional contact against the motion resistance. Since the skids 36, 38 are interiorly offset with respect to wheels 32, 34 and due to the narrower width of sledge conveyor K, the wheels 32 and 34 will not touch the floor 40 during the transport with the sledge conveyor K.

As can be further seen from FIG. 2, the distance between the skids 36 and 38 is less than the distance between the wheels 32 and 34. Preferably, the length of the skids 36 and 38, respectively, should be less than the axle distance between the front pairs of wheels 32, 34 and corresponding rear pair of wheels of the carrying frame 54. Thus the frame 54 in a preferred embodiment is provided with a pair of wheels (32 and 34 at its front end and with another pair of wheels (not shown) at the rear end. Thus, the carrying frame 54 is designed as a biaxial carriage.

During the transport on the drag chain conveyor R, the skids 36 and 38, respectively, will moreover act as guide elements in a manner that the side faces of the skids are led between rollers 50. Thus, it is guaranteed that especially with an automatic conveyance system to convey the goods which must be transported through processing trains equipped with robots, for example, an exact conveying track is always followed.

I claim:

1. A floor conveyance system for transporting goods along a preselected conveyance path, said system comprising in combination:

a drag chain conveyor defining a first surface;

a skid conveyor having one end adjacent said drag chain conveyor and defining a second surface disposed at a level higher than said first surface of said drag chain conveyor, said drag chain and skid conveyors together defining said conveyance path;

conveying frame means operatively engageable in said drag chain and said skid conveyors for supporting goods thereon and to convey said goods along said conveyance path, said frame means including a frame, front and rear pairs of wheels journally mounted to said frame to permit rolling movement across said first surface, said front and rear pairs of wheels being separated in the longitudinal direction by a predetermined dimension, and a pair of elongated parallel skid members fixedly mounted to said frame interiorly with respect to said front and rear pairs of wheels and each skid having a longitudinal length less than said predetermined dimension, said pair of skid members defining a contact surface at a level higher than the rolling contact of said front and rear pairs of wheels with said first surface, said contact surface establishing sliding contact with said second surface when said conveying frame is conveyed along said skid conveyor, and wherein, said front and rear pairs of wheels contact said first surface when said frame means is conveyed along said path by said drag conveyor while said pair of skid members are inoperative, and said front and rear pairs of wheels are disengaged from said rolling contact with said first surface when said pair of skid members come into engagement with said second surface of said skid conveyor.

2. A system as in claim 1 wherein said skid conveyor includes transverse conveying means for conveying said frame means transverse to said conveyance path.

3. A floor conveyor system as in claim 1 wherein said skid conveyor at said one end includes lifting table means to vertically lift said conveying frame means.

* * * * *